United States Patent [19]
Wright

[11] Patent Number: 4,610,597
[45] Date of Patent: Sep. 9, 1986

[54] GRIPPER INTERFACE FOR A ROBOT

[75] Inventor: Allen J. Wright, Corvallis, Oreg.

[73] Assignee: Intelledex Incorporated, Corvallis, Oreg.

[21] Appl. No.: 539,529

[22] Filed: Oct. 6, 1983

[51] Int. Cl.$^4$ .............................................. B66C 1/00
[52] U.S. Cl. .................... 414/729; 901/29; 901/31; 403/349; 192/67 R
[58] Field of Search ............. 901/19, 27, 29, 30, 901/28, 31; 192/87 R, 67 R; 403/97, 380, 146, 349, 1, DIG. 4; 414/729

[56] References Cited

U.S. PATENT DOCUMENTS

| | | | |
|---|---|---|---|
| 2,899,841 | 8/1959 | Melloy | 192/67 R |
| 3,512,817 | 5/1970 | Attermeyer | 192/67 R |
| 3,848,753 | 11/1974 | Borg et al. | 901/30 X |
| 4,086,991 | 5/1978 | Swadley | 192/67 R |
| 4,185,856 | 1/1980 | McCaskill | 403/349 X |
| 4,262,785 | 4/1981 | Anderson et al. | 192/67 R X |

FOREIGN PATENT DOCUMENTS

| | | | |
|---|---|---|---|
| 543513 | 3/1977 | U.S.S.R. | 901/30 X |
| 814721 | 3/1981 | U.S.S.R. | 901/28 X |

Primary Examiner—Robert J. Spar
Assistant Examiner—Dennis Williamson

[57] ABSTRACT

A mechanical interface for joining a gripper to a robot wrist of the type having a shaft projecting outwardly as the distal member of a robot arm. The interface includes a sleeve having an internal nut or flange for properly locating the sleeve with respect to the shaft. At this location, a bevel gear at the end of the shaft engages a similar gear within the sleeve so that the sleeve is locked to the shaft. The bevel gear within the sleeve is supported by a spring so that outward force from the sleeve allows separation of the gears and disconnection of the coupler from the shaft. Internal fluid passageways within the sleeve allow transmission of fluid pressure from the shaft to a connected gripper for transmitting power, control signals or sensing signals between the robot arm and the gripper.

1 Claim, 6 Drawing Figures

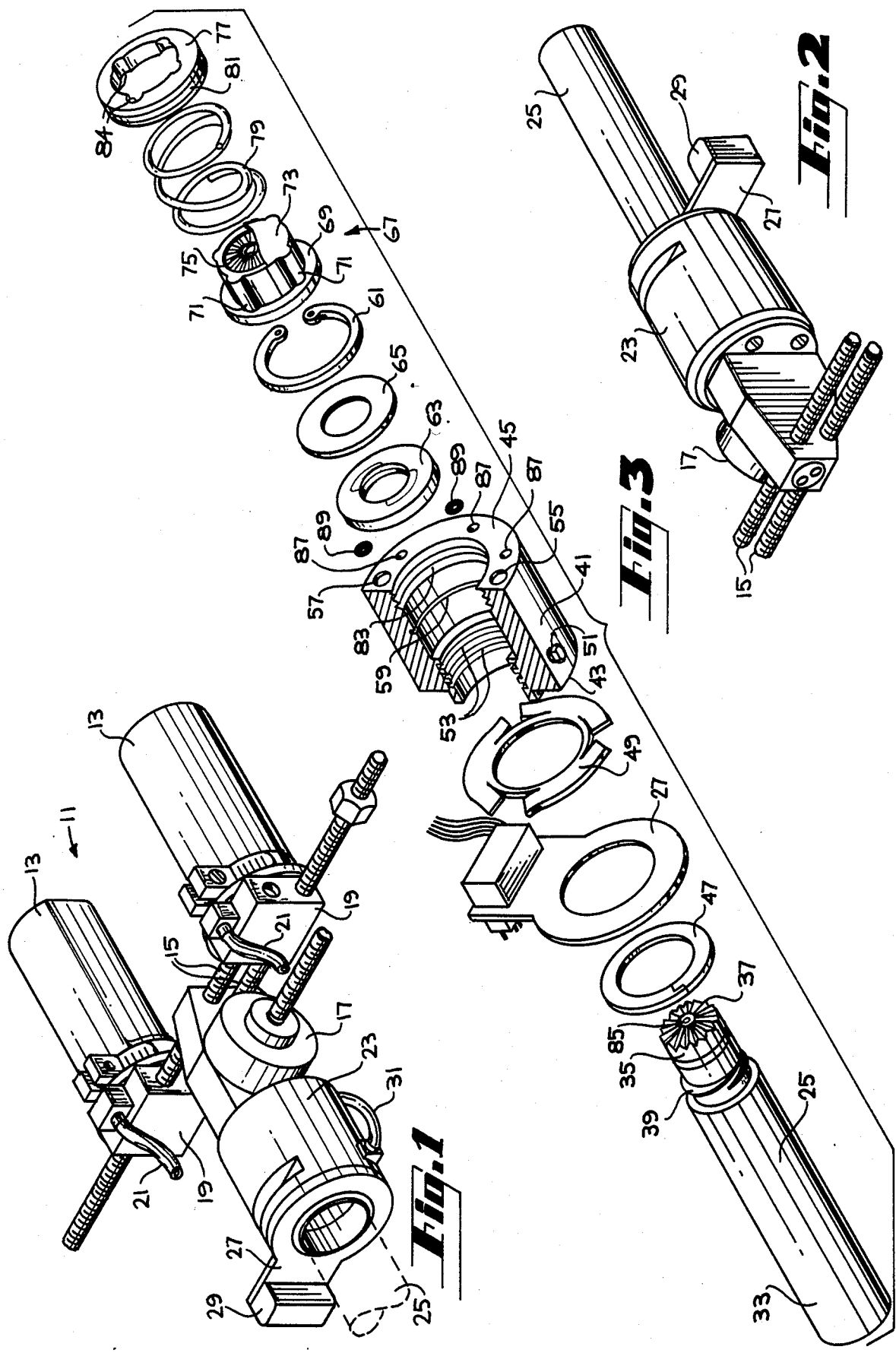

GRIPPER INTERFACE FOR A ROBOT

TECHNICAL FIELD

The invention relates to robot grippers and more particularly to a device for mounting a gripper or tool on a robot wrist or similar robot arm working member.

BACKGROUND ART

Robot arms typically include a series of rigid links connected at joints. The last link is associated with a robot wrist and gripper. The wrist has at least one degree of movement, such as rotation about an axis, similar to a human wrist. The gripper, analogous to a human hand, typically has the ability to open and close about an object, as well as the ability to sense and move objects.

The connection between the gripper and the wrist may be a permanently connected joint or a temporary connection by means of a mechanical interface. Temporary connections are often desired in order to change, clean or adjust grippers. Because of programmability found in most modern robots, they can be adapted to a wide variety of tasks. To take advantage of this capability, a need exists to change grippers without much loss of time.

An object of the invention was to devise an interface apparatus which is intended to join a gripper to a robot wrist or similar member with a rapid connection and disconnection.

SUMMARY OF THE INVENTION

The above object has been met with a gripper interface featuring a gripper coupler having an internal clutch which allows rapid separation of the coupler from a shaft extending from a robot, typically a portion of a robot wrist. The clutch serves to engage a gear on the shaft so that wrist motion can be transferred from the shaft to the gripper coupler. The coupler also includes an internal nut or flange which allows proper seating of the coupler relative to the robot wrist, as well as allowing motion to be transferred. The coupler is a sleeve which fits over the shaft extending from the robot wrist.

The clutch features a bevel gear in the sleeve which meshes with a similar gear on the shaft so that the sleeve turns as the shaft turns. The shaft includes an internal plunger which forces separation of the bevel gears when the sleeve is to be removed for changing of grippers. The sleeve also includes internal fluid passageways so that a gripper connected to the sleeve can be actuated by control lines extending through the robot arm and towards the gripper. Another use for the fluid passages is in sensing gripper position. By attaching an interface of the present invention to each gripper to be used with a robot arm, the grippers may be rapidly interchanged.

BRIEF DESCRIPTION OF DRAWINGS

FIG. 1 is a rear perspective view of a gripper interface and gripper member in accord with the present invention.

FIG. 2 is a front perspective view of the gripper interface of FIG. 1, showing only a portion of the gripper member connected to the interface.

FIG. 3 is a perspective exploded view of the gripper interface of FIG. 1.

BEST MODE FOR CARRYING OUT THE INVENTION

Figure 4:
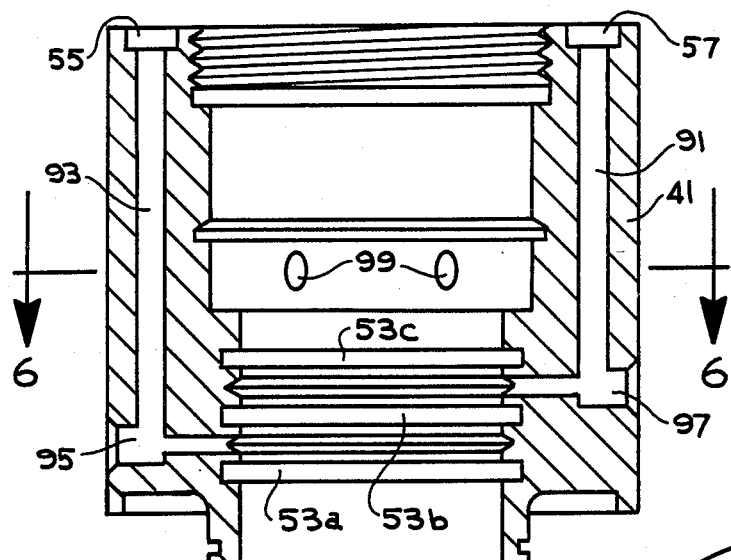
FIG. 4 is a side cutaway view of a portion of a gripper interface in accord with the present invention.

With reference to FIGS. 1 and 2, a robot gripper assembly 11 is shown having a pair of movable members 13 for manipulating objects. These two members move laterally by turning of threaded rods 15, using power supplied by a motor 17. Position transducers 19 monitor the position of members 13 on rods 15 and produce electrical signals on wires 21 for servo control of the gripper members.

The entire gripper assembly is connected to the gripper interface of the present invention. The interface features a gripper coupler 23 which receives a shaft 25. This shaft is the end of a robot arm, i.e. a robot wrist, and besides generally positioning gripper 11 in the desired location, has the capability of providing wrist motion, preferably rotation, to the gripper. A retainer 27 supports an electrical terminal 29 which receives control cables, as well as serving to terminate wires 21. A hydraulic line 31 may be connected to the gripper coupler for receiving fluid pressure from shaft 25 and transferring it to a portion of the gripper needing motive power or control, such as motor 17. Line 31 may also be used for sensing object or gripper position, such as by transmitting air pressure for an air gauge.

With reference to FIG. 3, shaft 25 has a driven end 33 and a working end 35. The working end includes a bevel gear 37 and a seating section 39 such that the shaft may be properly located with regard to a gripper interface. Seating section 39 may comprise an Acme thread or bayonet fins similar to the type used to mount lenses on cameras.

A gripper coupler which connects to shaft 25 features a sleeve 41 within a first end 43 facing shaft 25 and a second end 45 facing a gripper. End 43 has a retaining ring 47 holding down retainer 27 over finger spring washer 49. Retainer 27 is optional where electrical or hydraulic terminals are not needed.

Sleeve 41 may be seen to have a plug 51 capping a fluid exit port. This port is the same one to which hydraulic line 31 is connected in FIG. 1. Plug 51 caps an orifice which is fed by a chamber defined between O-rings 53 within the sleeve and having an exit port 55 which may be connected to similar passages in a gripper. A second exit port 57 carries fluid from another chamber having an entrance aperture between spaced-apart O-rings in the interior of the sleeve. The fluid carried in the passages is typically a gas, such as air or an inert gas. Sleeve 41 also has an annular groove 59 for seating retainer ring 61. Above the retainer ring is nut 63 and washer 65. Nut 63 has internal threads or ribs to engage the threads or fins of seating section 39 of shaft 25. Nut 63 is held in place by set screws bored through the side wall of sleeve 41, described below.

A clutch assembly consists of cup 67 and coil spring 79. Cup 67 has an upper rim 69, outwardly extending, parallel, surface ribs 71 which serve as keys for guiding the vertical or axial motion of the cup. The cup bottom 73 has an inside surface which is beveled in a radial pattern forming bevel gear 75 which matches bevel gear 37 of shaft 25. Coil spring 79 is compressed between rim 69 and threaded nut 77. External threads 81 screw into corresponding threads 84 in the interior of the second end of sleeve 45. The nut also has axially extending grooves 83 which form keyways for ribs 71 on cup 67. Cup 69 can move axially toward threaded nut 77 when pushed by a plunger 85 in the center of shaft 25. This allows the sleeve 41 to be disconnected from shaft 25 by disengaging the sleeve from seating section 39 of the thread, such as by turning. When plunger 85 is retracted bevel gear 37 of the shaft is firmly in contact with bevel gear 75 defined within cup 67.

Sleeve 41 is connected to a gripper by attachment using screws which pass into screw holes 87. A pair of O-rings 89 are used to seal exit ports 55 and 57 against fluid pressure losses.

With reference to FIG. 4, fluid pressure channels 91 and 93 may be seen within sleeve 41. O-rings 53a and 53b are spaced apart in the inside wall of the sleeve and define a first chamber between themselves which has an opening 95 for external communication, as from a source. This opening may be plugged as described with reference to FIG. 3. A similar chamber is defined between O-rings 53b and 53c. A passageway 91 leads from the chamber outwardly through opening 57. A second port 97 may be used by an external fluid pressure line or may be plugged.

While only two fluid pressure chambers and corresponding channels are shown, any number may be defined between spaced-apart O-rings in the inside wall near the first end 43 of the sleeve. FIG. 4 shows for the first time, apertures 90 which are used to allow the shanks of set screws to pass through sleeve 41 in order to hold nut 63 in place.

Figure 5:
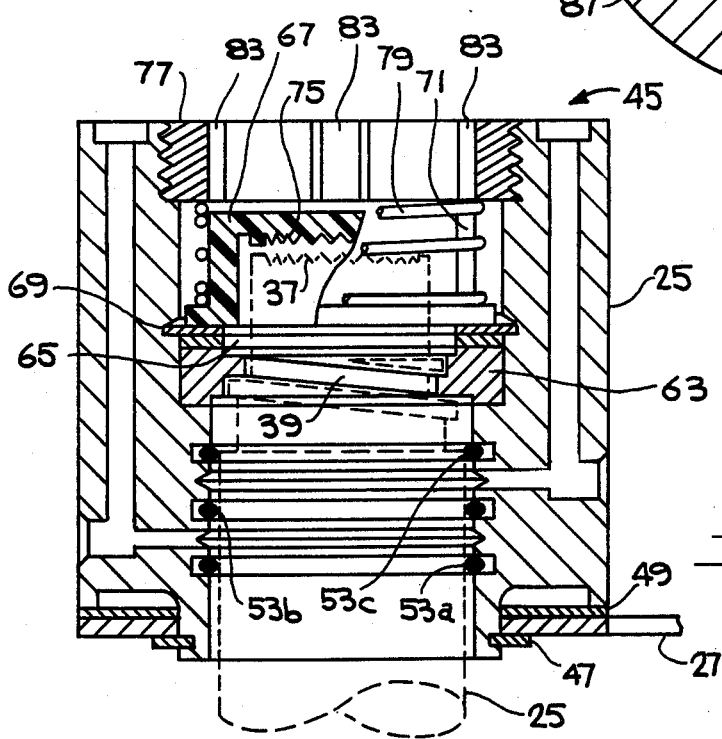
FIG. 5 is a more detailed cutaway of the gripper interface portion shown in FIG. 4.

FIG. 5 shows many of the individual components of FIG. 3 in their respective positions within the sleeve 41. Threaded nut 77 is seen in place with grooves 83 aligned to accept rib 71 on cup 67. Coil spring 79 surrounds the cup and is retained in place by nut 77 on one end and an upper rim of the cup 69. Washer 65 is seen to be disposed adjacent rim 69 and is seated against nut 63 which has the internal threads or grooves for receiving the seating section 39 of shaft 25. O-rings 53a, 53b and 53c are immediately below the seating section. The lowermost portion of sleeve 25 has washers 49, retainer 27 and retainer ring 47, the latter fitting into a groove for holding the former in place.

Figure 6:
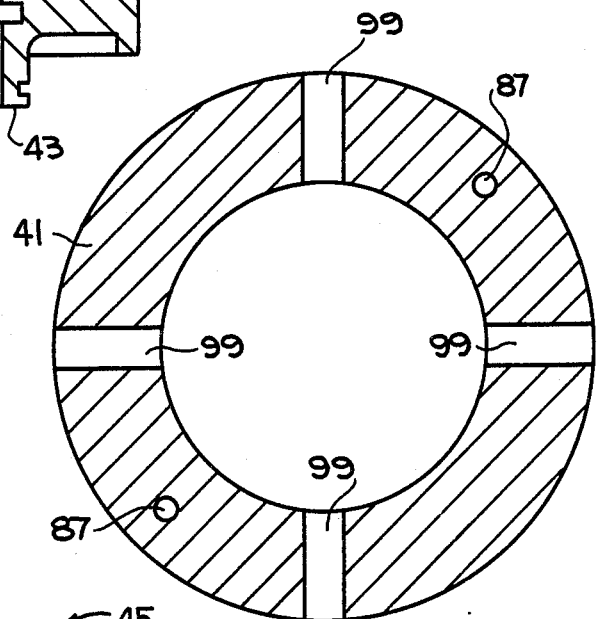
FIG. 6 is a cross sectional view taken along lines 6—6 in FIG. 4.

In FIG. 6, a cross section of sleeve 41 reveals the set screw apertures 99. The set screws hold nut 63 in position. It may be seen that the sleeve has more than nominal thickness. Typically, the thickness of the sleeve wall is on the order of a centimeter. The sleeve may be made of a polymer for easy machining or moulding. Cup 67 should be made of a tough material, but may also be a polymer or hard rubber. Nut 63 is preferably metal, such as steel, for engaging the threaded section of shaft 25.

As previously mentioned, a gripper is connected to second end of sleeve 45 by means of screw holes 87. The tool interface of the present invention is then coupled with shaft 25 by screwing the seating section 39 of the shaft, or otherwise locking it, relative to nut 63. This brings bevel gear 75 of cup 67 into meshing contact with bevel gear 37 of shaft 25. As the shaft is turned, the sleeve turns and the entire gripper assembly turns.

I claim:

1. A gripper interface for a robot comprising,
    a shaft having a driven end and a working end, the working end having means for seating a gripper coupler in a working position and a first bevel gear for transferring motion to the gripper coupler,
    a gripper coupler, connected to the seating means of the shaft, having a clutch means for engaging the motion transfer means, the shaft having a movable member for controlling the clutch, said gripper coupler having mounting means for connecting a robot gripper thereto, and
    a clutch having a cup-shaped member with an outwardly turned rim supported by an axial spring surrounding said cup-shaped member within the gripper coupler, the inner base of said cup-shaped member defining a second beveled gear capable of engaging the first bevel gear, the movable member of the shaft working against said spring to control the clutch, the outer portion of the cup-shaped member having surface ribs, said surface ribs fitting into grooves defined inside of a nut within said gripper coupler, said ribs preventing the cup-shaped member from rotating relative to the gripper coupler.

* * * * *